(12) United States Patent
Yamamoto

(10) Patent No.: US 7,161,708 B2
(45) Date of Patent: Jan. 9, 2007

(54) IMAGE PROCESSING APPARATUS AND METHOD ALLOWING CONTROL OF EDGE ENHANCEMENT EFFECT

(75) Inventor: Toshitsugu Yamamoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 1034 days.

(21) Appl. No.: 09/961,241

(22) Filed: Sep. 25, 2001

(65) Prior Publication Data
US 2002/0039200 A1    Apr. 4, 2002

(30) Foreign Application Priority Data
Sep. 27, 2000    (JP) ............................... 2000-293608

(51) Int. Cl.
*G06K 15/00* (2006.01)
(52) U.S. Cl. ...................... 358/1.8; 358/3.22
(58) Field of Classification Search ................. 358/1.8, 358/3.01, 3.03, 3.06, 3.07, 3.1, 3.11, 3.12, 358/3.13, 530, 443, 447, 461, 464, 3.22
See application file for complete search history.

(56) References Cited

U.S. PATENT DOCUMENTS

| | | | |
|---|---|---|---|
| 4,194,221 A | 3/1980 | Stoffel | |
| 4,668,995 A | 5/1987 | Chen et al. | |
| 4,955,065 A | 9/1990 | Ulichney | |
| 5,014,333 A | 5/1991 | Miller et al. | |
| 5,031,050 A | 7/1991 | Chan | |
| 5,045,952 A | 9/1991 | Eschbach | |
| 5,260,810 A * | 11/1993 | Kanno et al. ................ 358/462 |
| 5,325,211 A | 6/1994 | Eschbach | |
| 6,552,823 B1 * | 4/2003 | Chang ........................ 358/3.03 |
| 2001/0028468 A1 * | 10/2001 | Yamamoto ................... 358/1.9 |
| 2002/0039200 A1 * | 4/2002 | Yamamoto ................... 358/3.03 |

FOREIGN PATENT DOCUMENTS

| EP | 0467684 | * 1/1992 |
|---|---|---|
| JP | 2000-165669 | 6/2000 |

* cited by examiner

*Primary Examiner*—Jerome Grant, II
(74) *Attorney, Agent, or Firm*—Buchanan Ingersoll & Rooney PC

(57) ABSTRACT

Thresholding is performed on an inputted pixel value using a corrected threshold value in a thresholding unit, and a binarized pixel value is output. The output is inverted, and from the inverted output the threshold value used for the thresholding is subtracted, and the resultant value is distributed to threshold values used for processing of the surrounding pixels. At this time, an input value is added to the value to be distributed (feedback value). Then, in the thresholding of the next pixel, the input value is subtracted from the distributed value, and the result is subtracted from an initial threshold value to derive a value which becomes a threshold value to be used in the binarization. When the input value changes, there is an effect of canceling out the change so that the edge can be weakened.

11 Claims, 19 Drawing Sheets

F I G. 5

![Figure 5 block diagram]

- 201 WEIGHTED DISTRIBUTION
- 101 INPUT — CHANGES TO 0.5
- 203 *k
- 205 (+/−)
- 0.5
- 0.5 IS SUBTRACTED (INCREASES BY 0.3)
- 207 (+/+)
- THRESHOLD DECREASED BY 0.3 (SAME AS INCREASING INPUT BY 0.3)
- 103 THRESHOLDING
- 109 (−/+)
- 107 INITIAL THRESHOLD VALUE
- 105 OUTPUT
- 113 INVERSION
- 117 *β
- 115
- 209 WEIGHTED DISTRIBUTION

F I G. 6

|   |   |   |   |   | X | 3 | 2 | 1 |   |   |
|---|---|---|---|---|---|---|---|---|---|---|
|   |   | 1 | 2 | 3 | 3 | 3 | 2 | 1 |   |   |
|   |   | 1 | 2 | 2 | 2 | 2 | 2 | 1 |   |   |
|   |   | 1 | 1 | 1 | 1 | 1 | 1 | 1 |   |   |
|   |   |   |   |   |   |   |   |   |   |   |
|   |   |   |   |   |   |   |   |   |   |   |

LINE PATTERN SIGNAL TO BE ADDED TO THRESHOLD VALUE
$P = ((i/3 + j)\%4 - 1.5)/3$
i,j: PIXEL OF ITH ROW, JTH COLUMN
P: INTENSITY (OF 0.1 HEREIN)
INITIAL THRESHOLD VALUE = $0.5 + 0.05 \times P$ PROCESSING WHEN k = 0

PROCESSING WHEN k = 0.5

PROCESSING WHEN k = 0.8

PROCESSING WHEN k = 1

PROCESSING WHEN k = − 0.5

PROCESSING WHEN k = 0

F I G. 1 8
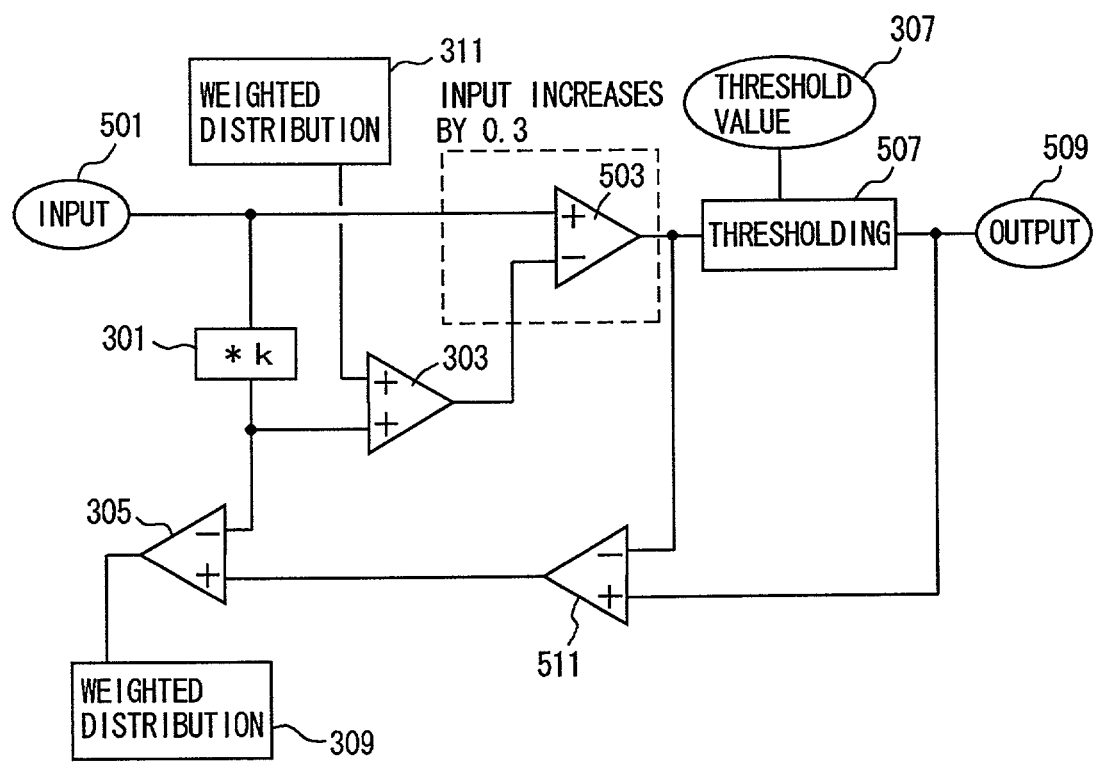

PROCESSING WHEN k = 0.6

PROCESSING WHEN k = 1

PROCESSING WHEN k = − 0.5

IMAGE PROCESSING APPARATUS AND METHOD ALLOWING CONTROL OF EDGE ENHANCEMENT EFFECT

This application is based on application No. 2000-293608 filed in Japan, the content of which is hereby incorporated by reference.

BACKGROUND OF THE INVENTION

1. Field of the Invention

The present invention relates to an image processing apparatus, and more specifically, to an image processing apparatus that allows formation of an image in which gradations are reduced using a threshold value.

2. Description of the Related Art

Digital handling of images is currently dominant in the field of image processing. When displaying or outputting a digital image, there often is a need to express the gradations of the image using a smaller number of gradation levels due to restrictions imposed by the characteristics of the output device and so on. From the early stages of development, various image processing techniques of digital half toning, such as binarization in which the gradations are reproduced by white and black dots alone as a pseudo halftone processing, have been researched.

Among such techniques, an error diffusion method and a threshold value diffusion method, which is proposed by the applicant of the present invention in Japanese Patent Laying-Open No. 2000-165669, have proved to be particularly superior in that they maintain good resolution and gradation quality.

In the error diffusion method and the threshold value diffusion method, however, no technique had been established that enabled an edge enhancement effect to be controlled freely. Thus, the object of the present invention is to provide an image processing apparatus that allows effective control of the edge enhancement effect with extremely simple processing in a half toning process such as the error diffusion method or the threshold value diffusion method.

SUMMARY OF THE INVENTION

According to one aspect of the present invention, an image processing apparatus is provided with an input unit for successively receiving as input a first image signal representing each pixel, a thresholding unit for performing thresholding on the inputted first image signal using a prescribed threshold value, and a distributing unit for distributing a value used in the thresholding in a succeeding pixel, where the thresholding unit performs thresholding based on the value distributed by the distributing unit and on a specific value determined for each pixel, and the distributing unit calculates a value to be distributed to the succeeding pixel based on an input signal and an output signal of the thresholding unit and on the specific value determined for each pixel.

According to another aspect of the present invention, an image processing method includes the steps of successively inputting a first image signal representing each pixel, performing thresholding on the inputted first image signal using a prescribed threshold value, and distributing a value used in the thresholding in a succeeding pixel, where the step of performing thresholding is done based on the value distributed by the distributing unit and on a specific value determined for each pixel, and the step of distributing calculates a value to be distributed to the succeeding pixel based on an input signal and an output signal of the thresholding unit and on the specific value determined for each pixel.

According to these inventions, when an input value changes in the image processing, the change can be enhanced or diminished at will. Consequently, the edge enhancement effect can be controlled freely.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 5 are diagrams related to the description of processing according to the first embodiment.

FIG. 6 is a diagram showing a specific example of a diffusion weight coefficient.

FIGS. 15 to 18 are diagrams related to the description of processing according to the second embodiment.

DESCRIPTION OF THE PREFERRED EMBODIMENTS

Reference Example

Figure 29:
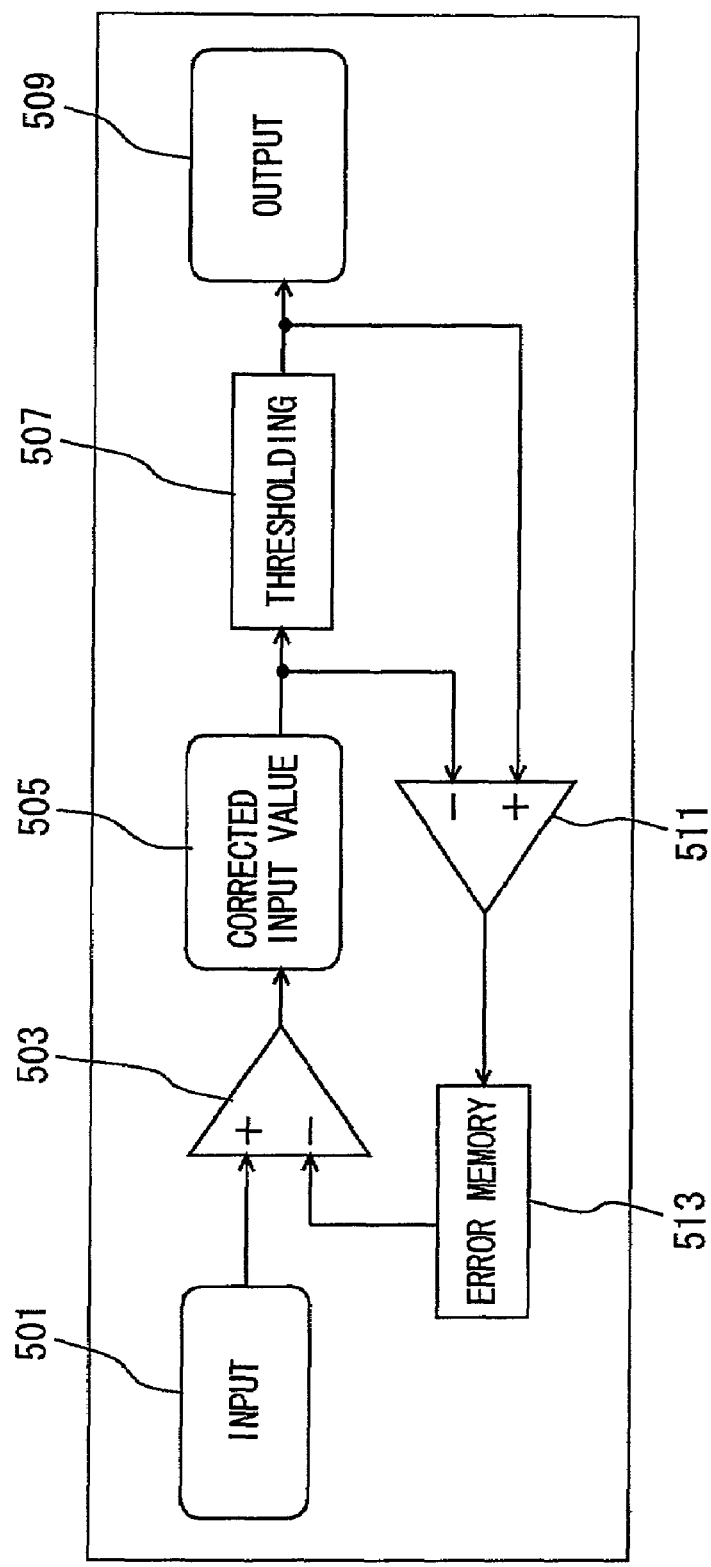
FIG. 29 is a diagram representing an arrangement of an image processing apparatus using an error diffusion method.

FIG. 29 is a block diagram representing an arrangement of an image processing apparatus executing an error diffusion method in the reference example of the present invention.

Referring to the diagram, the image processing apparatus includes an input unit 501 for receiving as an input a pixel value of one pixel of a multi-value image, a subtractor 503 for subtracting a diffused error from the input pixel value, an output unit 505 for outputting an output from subtractor 503 as a corrected pixel value, a thresholding unit 507 for performing thresholding on an output of output unit 505 to form binary data, an output unit 509 for outputting an output of thresholding unit 507 as pixel data, a subtractor 511 for subtracting the output of output unit 505 from the output of thresholding unit 507, and an error memory 513 for diffusing an output result from subtractor 511 to pixels surrounding a pixel which is the object of processing (pixel of interest).

Figures 30, 32:
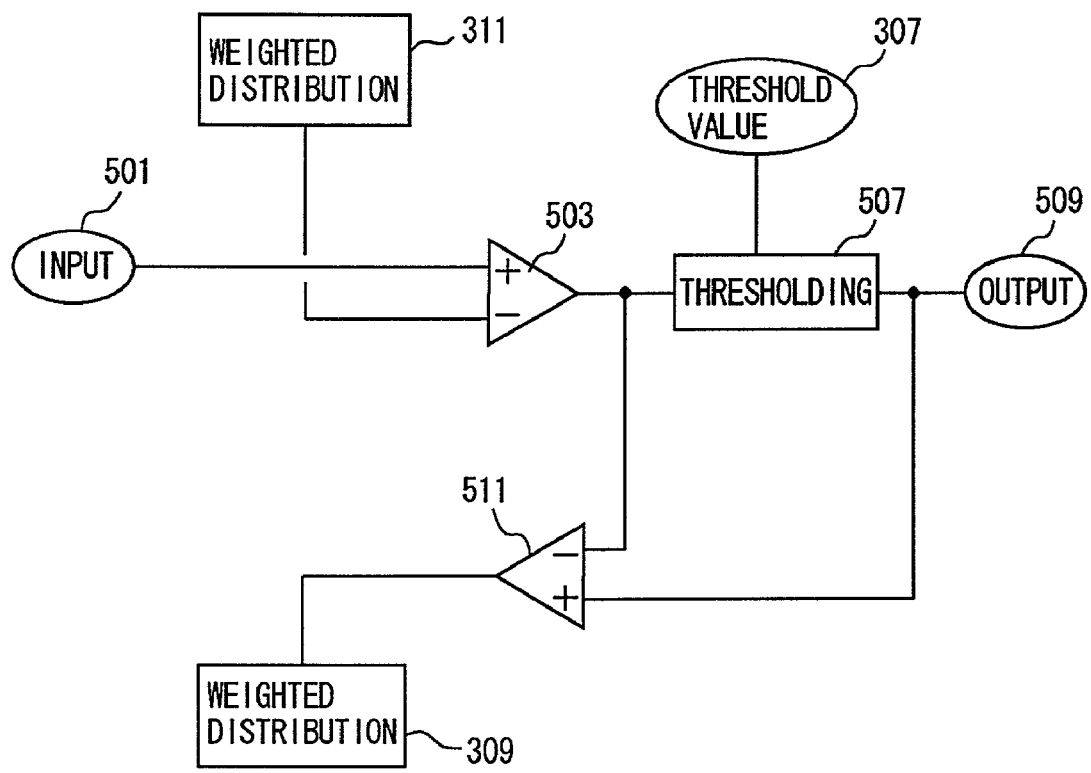
FIG. 30 is another diagram representing an arrangement of an image processing apparatus using an error diffusion method.
FIG. 32 is a diagram related to the description of the function of a correction value memory 119.

Moreover, an output of subtractor 511 shown in FIG. 29 is to be distributed to the surrounding pixels by error memory 513 so that the image processing apparatus shown in FIG. 29 may be represented as shown in FIG. 30.

Thus, as shown in FIG. 30, the output of subtractor 511 in the processing of a pixel is distributed to the surrounding pixels by weighted distribution units 309, 311. The result of distribution is input to subtractor 503.

In addition, a threshold value used in thresholding unit 507 may be set by a threshold value setting unit 307.

Figure 31:
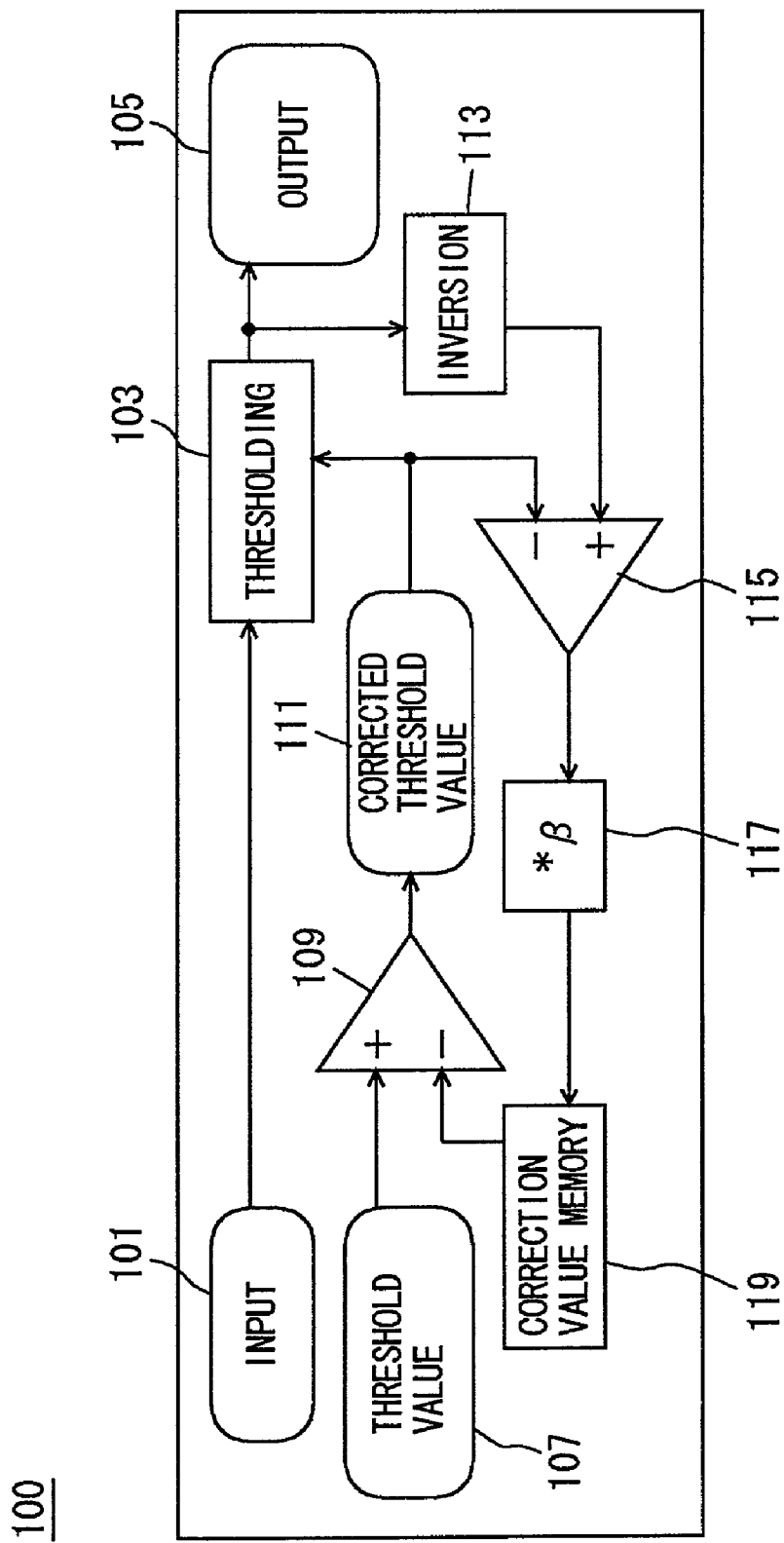
FIG. 31 is a block diagram representing an arrangement of an image forming apparatus in a reference example.

FIG. 31 is a block diagram representing an arrangement of an image forming apparatus in a reference example of the present invention. The binarizing process of an image performed by the apparatus will be referred to as a "threshold value diffusion method." In the diagrams of the present application, a portion enclosed by a normal rectangle represents a portion performing some sort of operation, while a portion enclosed by a rounded rectangle represents a portion that performs no operation and simply outputs a value.

Referring to the diagram, the image forming apparatus includes an image (pixel value) input unit 101, a thresholding unit 103, a binary image output unit 105, an inverting unit 113, an initial threshold value generating unit 107, a subtracting unit 109, a corrected threshold value output unit 111, a subtracting unit 115, a coefficient multiplying unit 117, and a correction value memory 119.

One pixel value (0 to 1) of a multi-value image is input to image input unit 101. When a multi-value image n of 256 gradations (0 to 255) is to be handled, for instance, a normalized value normalized to 0 to 1 (n/255) is input to image input unit 101. Thresholding unit 103 compares a corrected threshold value Th(x) output from corrected threshold value output unit 111 with the pixel value input to image input unit 101. When pixel value≧corrected threshold value Th(x), thresholding unit 103 outputs "1," whereas when pixel value<corrected threshold value Th(x), thresholding unit 103 outputs "0." Consequently, binary image output unit 105 outputs an image having binary value of "0" or "1."

Initial threshold value generating unit 107 outputs an initial threshold value Th(x) before correction. The initial threshold value Th(x) before correction may be a constant value, or it may be varied in accordance with the position of the pixel so as to provide a dither pattern.

Subtractor 109 reads a correction value stored in correction value memory 119 which corresponds to the pixel which is the object of processing (pixel of interest), and subtracts the correction value from the initial threshold value Th(x). The result becomes the corrected threshold value Th(x).

Inverting unit 113 inverts an output from thresholding unit 103. In other words, inverting unit 113 outputs "1" when the output of thresholding unit 103 is "0," and outputs "0" when the output is "1."

Subtracting unit 115 subtracts corrected threshold value Th(x) from the output of inverting unit 113 and outputs the result. Coefficient multiplying unit 117 multiplies the output of subtracting unit 115 by a feed back coefficient β, which is set between 0 and 1, and outputs the result. Note that setting β=0 means that the threshold value diffusion is not to be performed.

Correction value memory 119 is a memory for distributing the output result of coefficient multiplying unit 117 to the correction values of the threshold values for pixels surrounding the pixel which is the object of processing. Referring to FIG. 32, when the pixel which is the object of processing is shown as a white circle, the output result from coefficient multiplying unit 117 is allocated at the ratio (weight coefficient) of 1 to 32 to the correction values of threshold values of the surrounding pixels and the corrected values are stored.

[Embodiments]

First Embodiment

An image forming apparatus according to the first embodiment of the present invention will be described below. The image forming apparatus according to the first embodiment is characterized in that it performs control of the edge enhancement effect by simple processing, while at the same time, performing half toning process.

The threshold value diffusion method described as a reference example above is a superior half toning method that may replace the error diffusion method, but it has an edge enhancement effect, the degree of which could not be controlled, so that the situations in which it could be employed is disadvantageously limited. The first embodiment allows the intensity of the edge enhancement effect to be controlled freely without substantially changing the load of the threshold value diffusion method in the above reference example.

According to the first embodiment, in the threshold value diffusion method, an input value is added to a value to be fed back (a feedback value), and the result is weighted and diffused to threshold values of surrounding pixels. Then, upon using the feedback value, the input value at that time is subtracted the feedback value. When the input value does not change and remains constant, this operation involves only adding and subtracting the input value (which is constant) so that no effect is produced, but when the input value changes, the operation functions to diminish the change. Consequently, the edge can be weakened.

When the amount of the input value added to the feedback value is changed, the effect changes to the extent the amount is changed. By reversing the sign of the input value added, edge enhancement can be effected.

Figure 1:
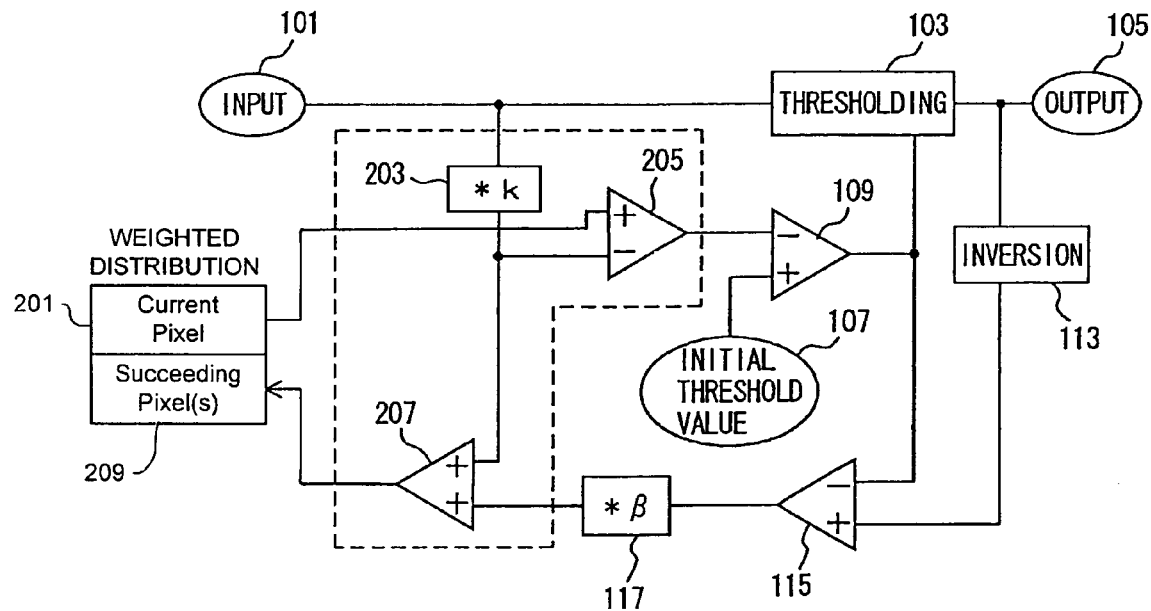
FIG. 1 is a block diagram representing an arrangement of an image forming apparatus according to a first embodiment of the present invention.

FIG. 1 is a block diagram representing an arrangement of the image forming apparatus according to the first embodiment.

Referring to the diagram, in the first embodiment, a portion enclosed by the broken line of FIG. 1 is additionally provided as an algorithm for controlling the edge enhancement effect to the image forming apparatus that employs the threshold value diffusion method in the reference example of FIG. 31. In the portion enclosed by the broken line are provided a k multiplying unit 203 for multiplying an input value of image input unit 101 by k, an adding unit 207 for adding an output of k multiplying unit 203 and an output of coefficient multiplying unit 117, and a subtractor 205 for subtracting the output of k multiplying unit 203 from a value that is weighted and distributed. In addition, an output of adding unit 207 is distributed to threshold values of surrounding pixels by a weighted distribution unit 209 and a weighted distribution unit 201.

An operation of the image processing apparatus according to the first embodiment will be described below with reference to FIGS. 2 to 5. Here, for simplicity of description, it is set such that k=1, and an input value takes a value in a range of 0 to 1. In addition, it is assumed that the input value indicates a darker color as it increases from 0 toward 1.

Figure 2:
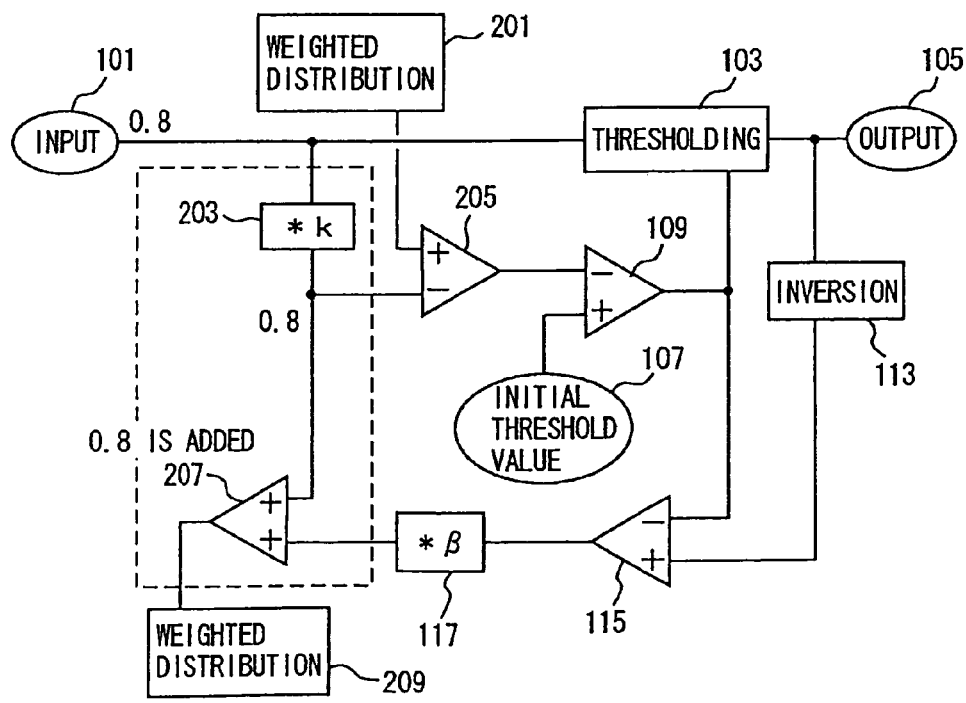

As shown in FIG. 2, if the input value is 0.8 and constant, k multiplying unit 203 performs processing of 0.8×1=0.8, and adding unit 207 adds this value of 0.8 to a feedback value (output of coefficient multiplying unit 117). Consequently, the feedback value to be distributed becomes larger by 0.8 than that of the image forming apparatus shown in FIG. 31.

Figure 3:
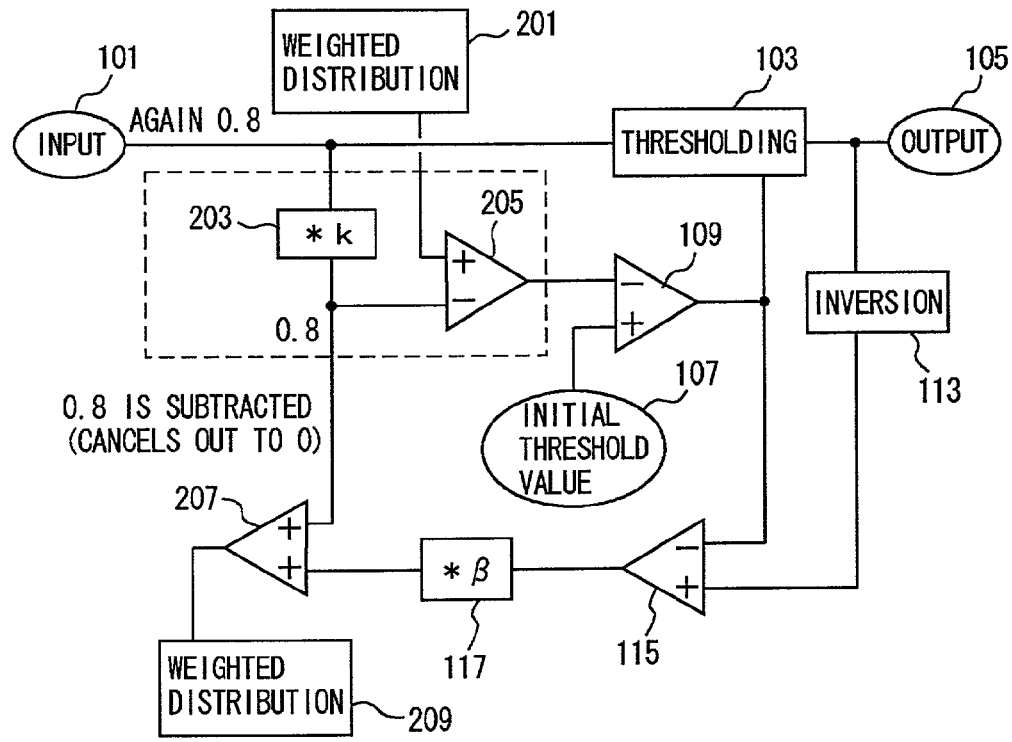

As shown in FIG. 3, if the input remains unchanged at 0.8 in the processing of the next pixel, k multiplying unit 203 would perform processing of 0.8×1=0.8, and subtractor 205 would subtract this value of 0.8 from a value that is weighted and distributed (feedback value). In other words, in the processing of FIGS. 2 and 3, merely the operations of adding 0.8 to the feedback value and subsequently subtracting 0.8 therefrom are ultimately performed so that the same processing is performed as the threshold value diffusion process in the above-described reference example.

Figure 4:
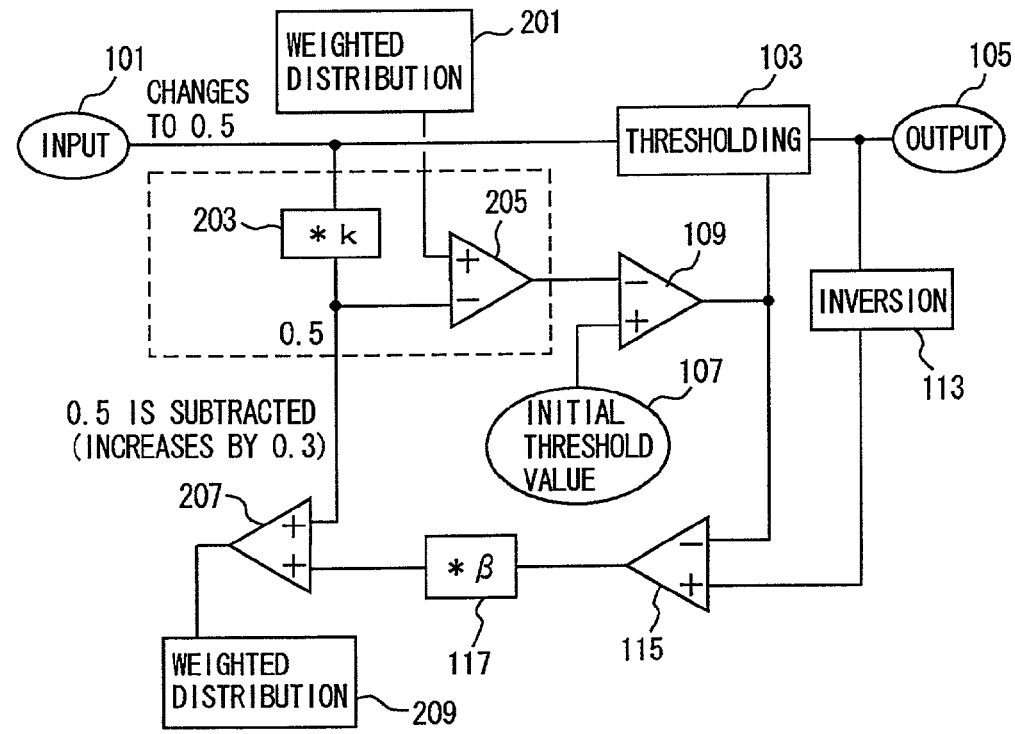

On the other hand, if the input value is reduced to 0.5 as shown in FIG. 4 after the processing of FIG. 2, although 0.8 was added to the feedback value in FIG. 2, subtractor 205 would only subtract 0.5 from the feedback value in FIG. 4. Consequently, the feedback value becomes +0.8−0.5=+0.3 such that it increases from its original value by 0.3.

As shown in FIG. 5, the feedback value is subtracted from an initial threshold value by subtracting unit 109 so that the feedback value being increased by 0.3 is the same as the threshold value being decreased by 0.3. Moreover, the threshold value being decreased is the same as the input value being increased.

As shown by the above-described processing, the image processing apparatus according to the first embodiment ultimately achieves the same effect as increasing the input value in order to diminish the change in the input value when the input value changes in the direction of becoming smaller.

Conversely, the image processing apparatus according to the first embodiment achieves the same effect as decreasing the input value in order to diminish the change in the input value when the input value changes in the direction of becoming larger. With such processing, the edge can be weakened within the image which is the object of processing.

Moreover, when the value of k is changed, the intensity of the effect can be changed to the extent the value of k is changed so that the user can set the strength of the edge at will by simple processing. Conversely, when k is set to a negative value, the change of the input can be enhanced (the edge can be strengthened).

Next, a specific example of processing performed by the image processing apparatus according to the above-described embodiment will be described.

In this example, a diffusion weight coefficient shown in FIG. 6 is employed as the diffusion weight coefficient used for performing the weighted distribution. Referring to FIG. 6, a feedback value (output of adding unit 207) produced by the processing of the pixel of interest (X) is distributed to pixels indicated by "3," "2," and "1."

A 3/40 of the feedback value would be distributed to a pixel indicated by "3," a 2/40 of the feedback value would be distributed to a pixel indicated by "2," and a 1/40 of the feedback value would be distributed to a pixel indicated by "1."

Figure 7:
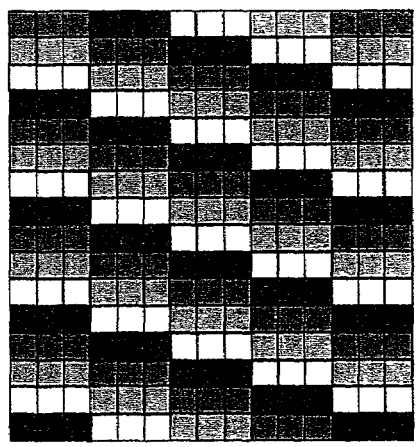
FIG. 7 is a diagram showing a specific example of a pattern of an initial threshold value.

In addition, in this example, initial threshold value generating unit 107 outputs a pattern of a threshold value shown in FIG. 7. This is a pattern for producing closely arranged parallel lines directed toward a direction that is 70 degrees from the horizontal direction, More specifically, an initial threshold value is calculated using a formula: initial threshold value=0.5+0.05×P. Then, P in this formula is a line pattern signal to be added to a threshold value, and is calculated by the following formula:

$$P=((i/3+j)\%4-1.5)/3$$

Here, (i, j) are numerical values representing a coordinate of a pixel. In addition, %4 represents a remainder produced as a result of division by 4.

Moreover, in this example, it is set such that a diffusion coefficient $\beta=0.48$, and it is adjusted such that no dot is output when the input is 0, while a dot is output when the input is not 0.

Figure 8:
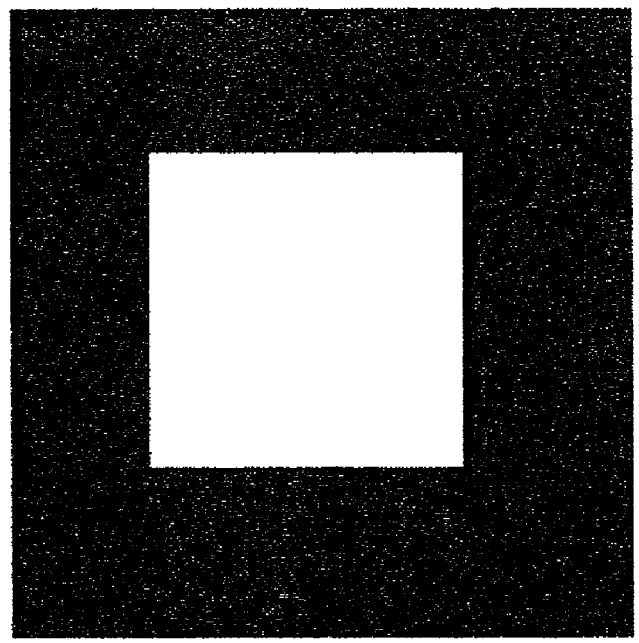
FIG. 8 is a diagram showing a specific example of an image as an object to be processed.

FIG. 8 is a diagram showing an original image as the object to be processed. In this image data, one pixel takes a value between 0 to 255, where the density of the pixel becomes greater as the value increases from 0 toward 255. A pixel of a portion that appears white in FIG. 8 is a pixel having a density of "4," and a pixel that appears black is a pixel having a density of "251." In addition, there is a line made of pixels having a density of "245" in the area indicated by the arrows in the portion that appears black.

FIGS. 9 to 13 are diagrams showing the results of thresholding in the cases where k=0, 0.5, 0.8, 1, −0.5, respectively.

Figure 9:
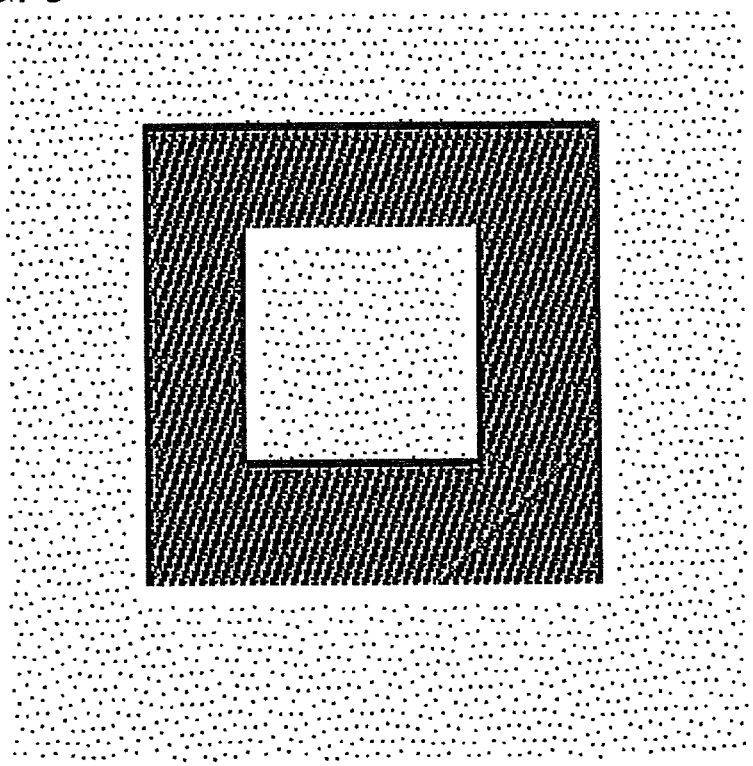
FIGS. 9 to 13 are diagrams showing the effects when k=0, 0.5, 0.8, 1, −0.5, respectively, in the first embodiment.

When k=0, the processing that is performed by the portion enclosed by the broken line in FIG. 1 is not performed, and the same processing as the processing that is performed by the image processing apparatus employing the threshold value diffusion method shown in FIG. 3 is performed. Thus, an edge of the image is enhanced as shown in FIG. 9.

Figure 10:
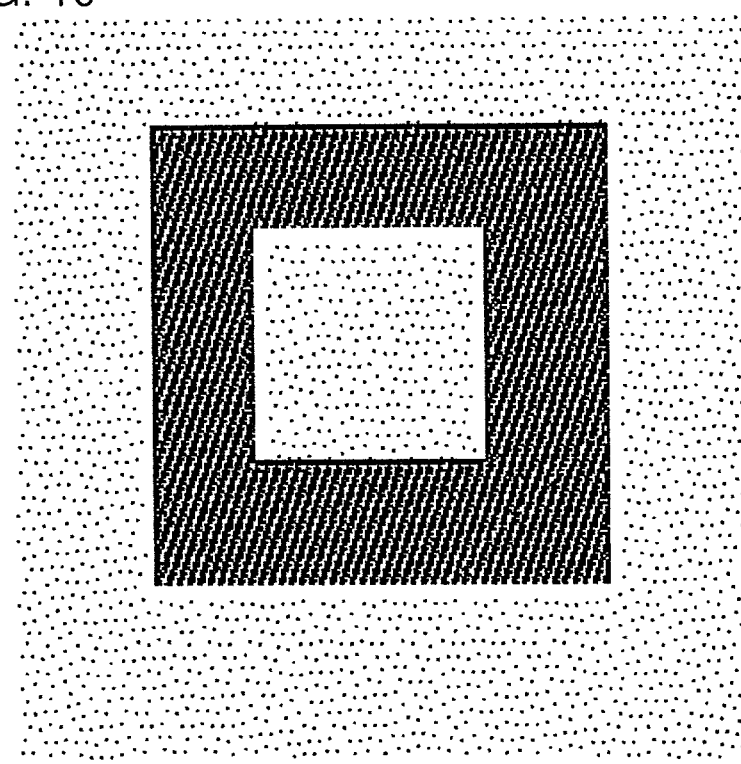
Figure 11:
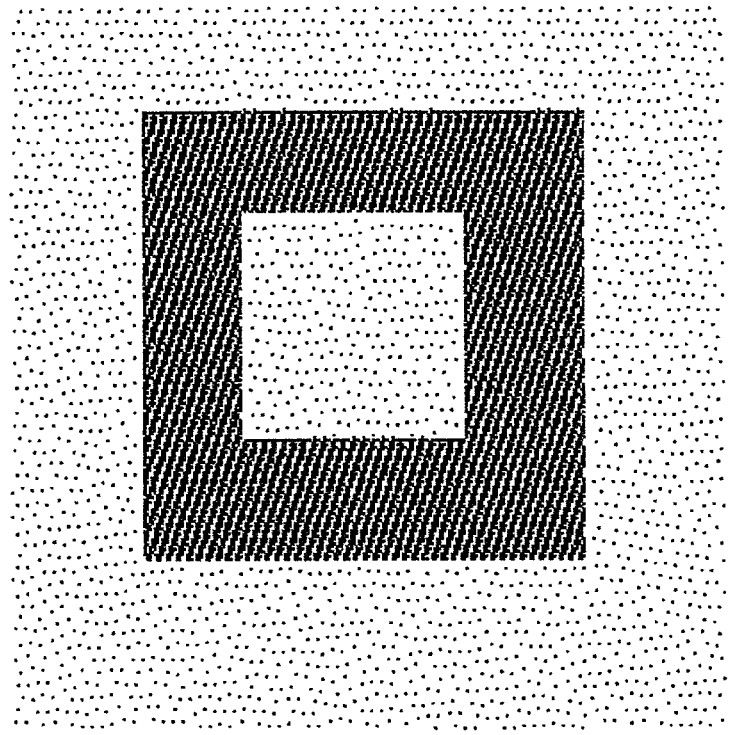
Figure 12:
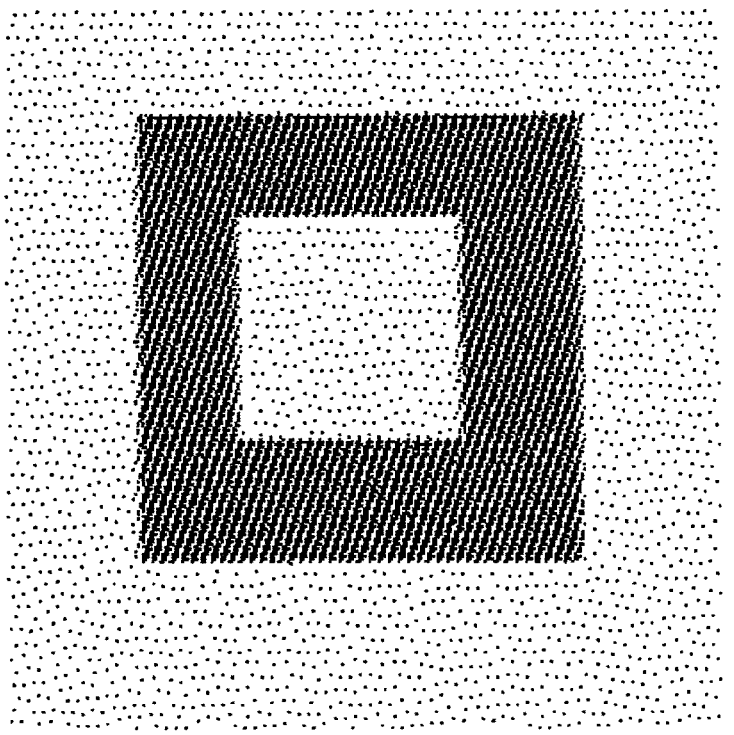

As shown in FIGS. 10 to 12, it can be seen that the edge becomes weaker as the value of k is increased. This is because the effect to cancel out the change in the input becomes stronger as the value of k is increased, as described above. The user may subtly adjust the strength of an edge by successively changing the value of k at will.

Figure 13:
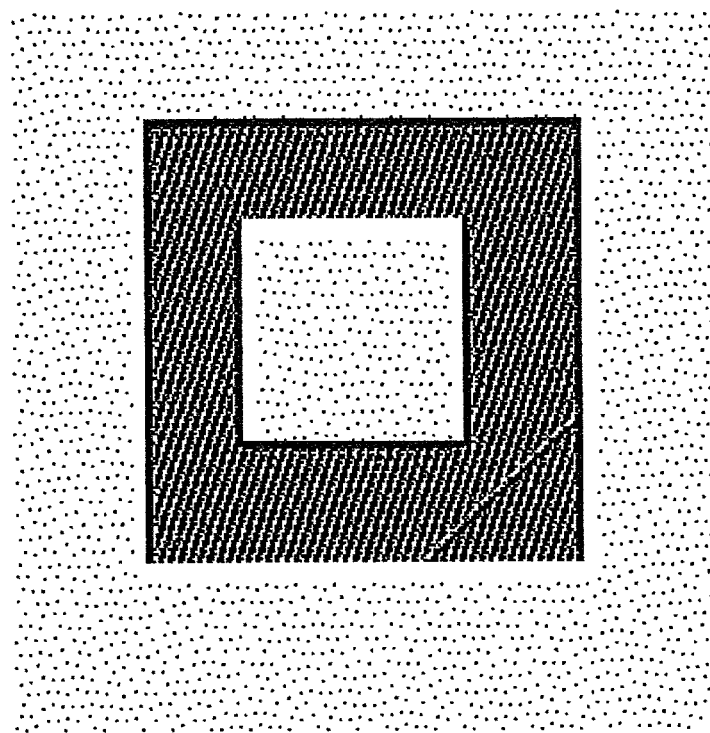

Conversely, as shown in FIG. 13, the edge can be strengthened by selecting a negative value for k.

As described above, the first embodiment allows edge control in the threshold value diffusion method without particularly increasing the burden of processing.

Second Embodiment

The second embodiment provides for the control of the edge enhancement effect of an image processing apparatus employing an error diffusion method.

In the error diffusion method, also, the edge enhancement effect would become obvious with a broader range of error diffusion so that some measure was required. The second embodiment allows the intensity of the edge enhancement effect to be controlled freely without substantially changing the load in the error diffusion method.

Figure 14:
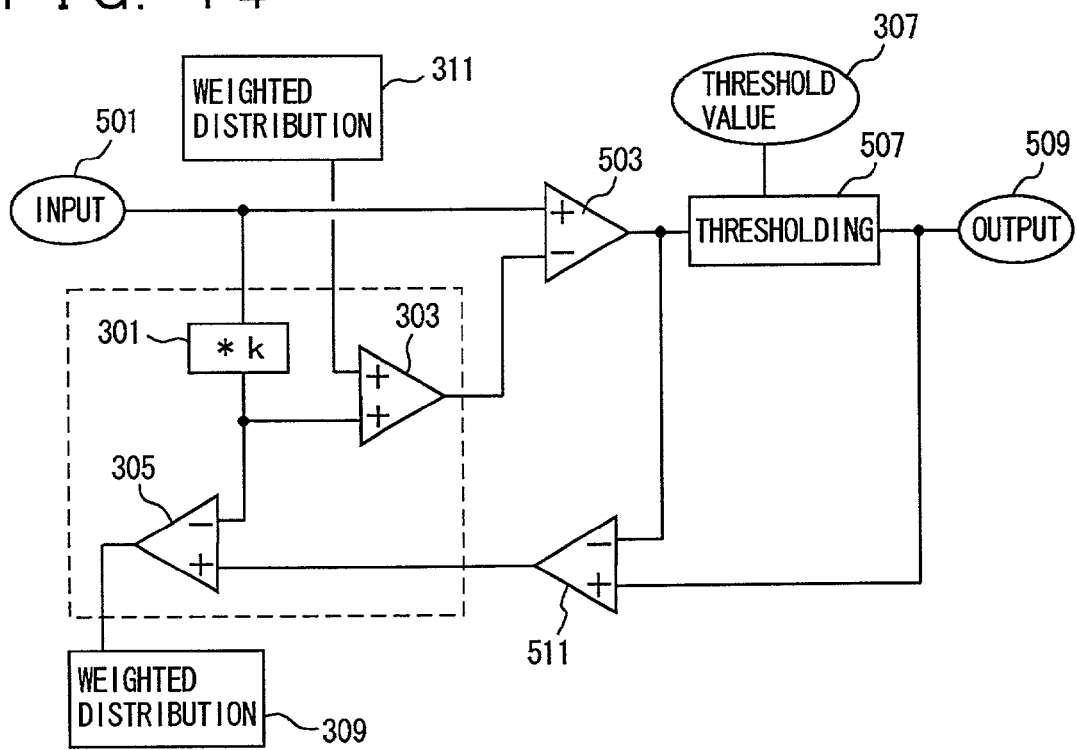
FIG. 14 is a block diagram representing an arrangement of an image processing apparatus according to a second embodiment of the present invention.

FIG. 14 is a block diagram representing an arrangement of an image processing apparatus according to the second embodiment. Referring to the diagram, in the second embodiment, a portion enclosed by the broken line is additionally provided to the image processing apparatus (see FIGS. 29 and 30) employing a normal error diffusion method.

In other words, in addition to the arrangement of the image processing apparatus shown in FIG. 30, the image processing apparatus according to the second embodiment is provided with a k multiplying unit 301 for multiplying an input value by k, a subtractor 305 for subtracting an output of k multiplying unit 301 from an output from subtractor

511, and an adding unit 303 for adding the output of k multiplying unit 301 to an error that is weighted and distributed.

In the second embodiment, also, the edge enhancement effect can be changed freely by changing the value of k.

Referring to FIG. 14, the second embodiment performs the operation of distributing an input value multiplied by k to the neighboring pixels along with an error (subtracting from the error), and adding the input value multiplied by k to the distributed value when an error is received from the neighboring pixels.

Such an operation would only involve processing of subtracting and adding a constant value when the input value does not change, so that there is no effect. When the input changes, however, such operation functions to diminish the change. As an amount of the input value added to the error is changed (that is, when the value of k is changed), the effect successively changes. In addition, by reversing the sign of k, edge enhancement can be effected.

Next, an operation of the image processing apparatus according to the second embodiment will be described with reference to FIGS. 15 to 18. Here also, for simplicity of description, it is set such that k=1, and an input value takes a value in a range of 0 to 1. In addition, it is assumed that the input value indicates a darker color as it increases from 0 toward 1.

Figure 15:
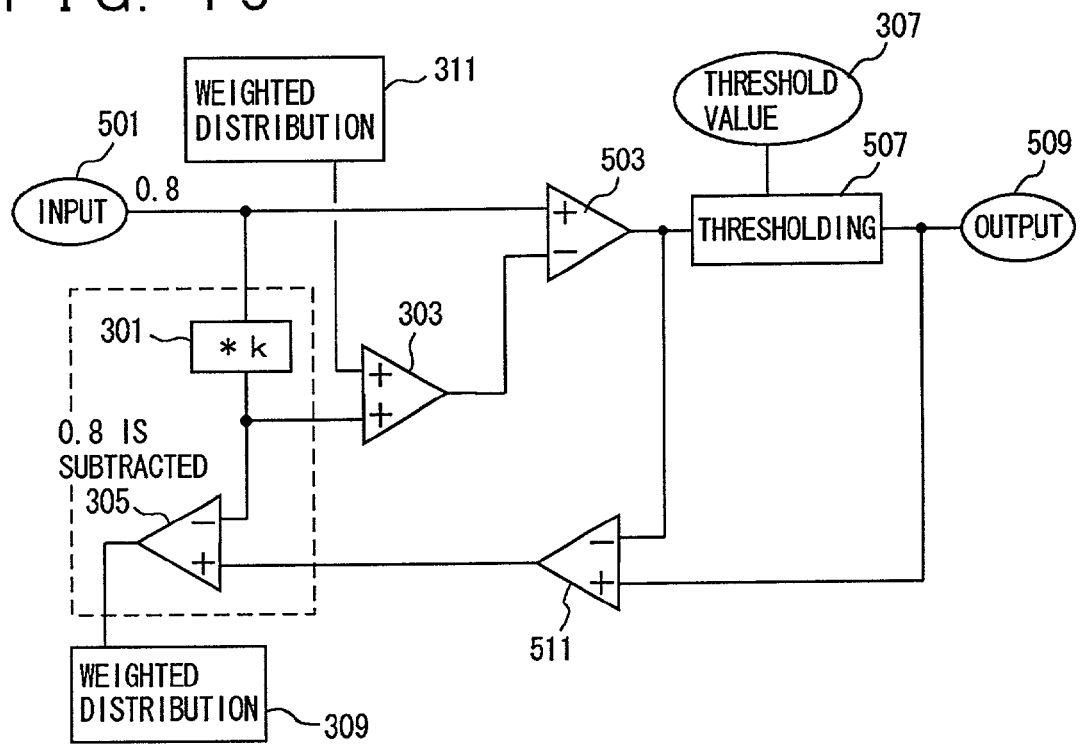

As shown in FIG. 15, if the input value is 0.8 and constant, k multiplying unit 301 performs processing of 0.8×1=0.8, and subtractor 305 subtracts this value of 0.8 from an error. Consequently, the error to be distributed becomes smaller by 0.8.

Figure 16:
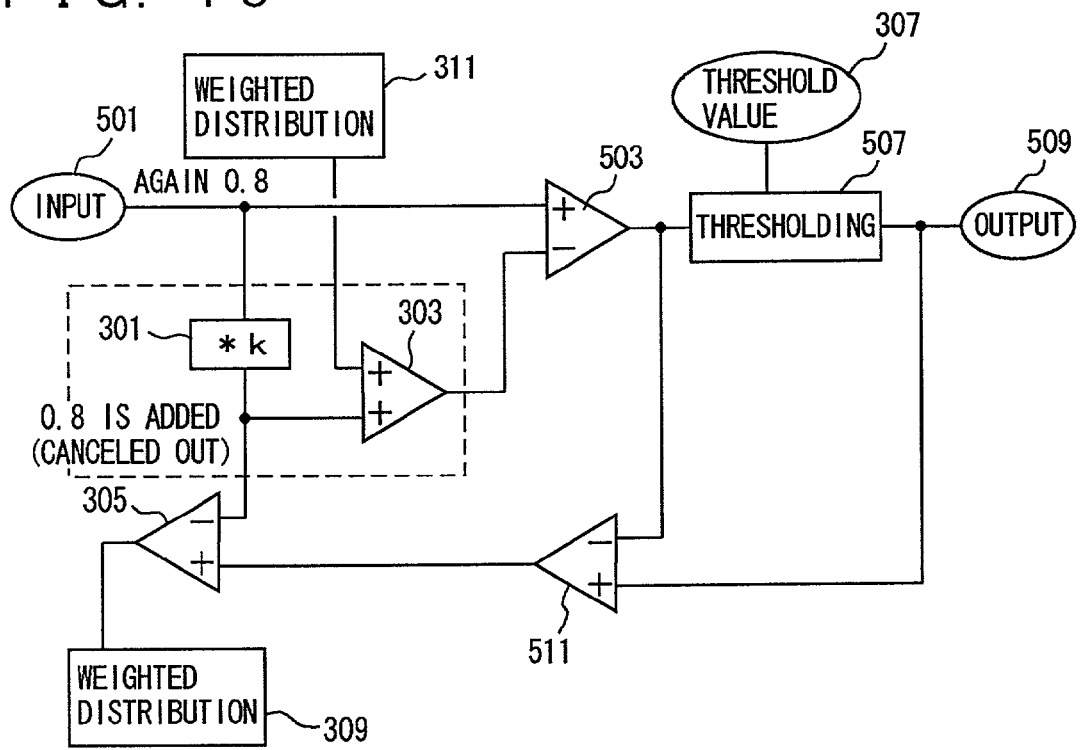

As shown in FIG. 16, if the input remains unchanged at 0.8 in the processing of the next pixel, k multiplying unit 301 would perform processing of 0.8×1=0.8, and adding unit 303 would add this value of 0.8 to the distributed error.

In other words, in the processing of FIGS. 15 and 16, merely the operations of subtracting 0.8 from the error and subsequently adding 0.8 thereto are ultimately performed so that the same processing as a normal error diffusion process is performed.

Figure 17:
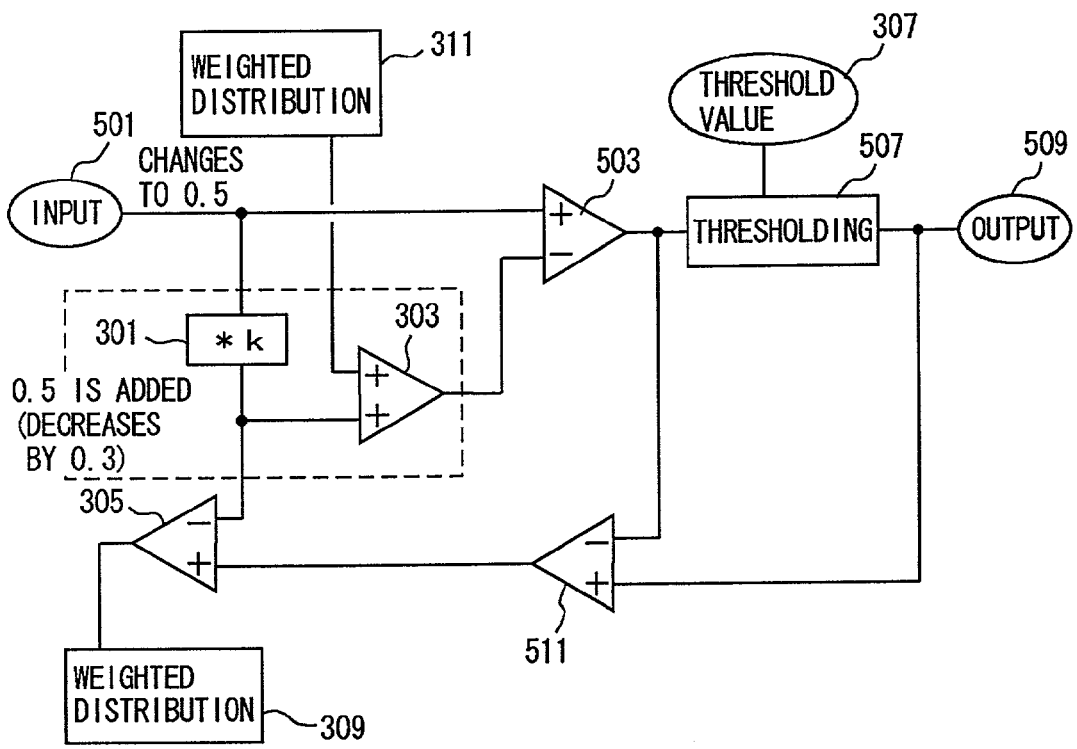

On the other hand, if the input value becomes 0.5 as shown in FIG. 17 after the processing of FIG. 15, although 0.8 was subtracted from the error in FIG. 15, adding unit 303 would only add 0.5 to the error. Consequently, the error becomes −0.8+0.5=−0.3 such that it decreases from its original value by 0.3.

Consequently, as shown in FIG. 18, the value to be subtracted by subtractor 503 is reduced by 0.3 so that the input ultimately increases by 0.3. In other words, an error made smaller is the same as an input made greater.

As shown by the above processing, the second embodiment achieves the same effect as increasing the input and decreasing the change when the input value changes in the direction of becoming smaller.

Conversely, the second embodiment similarly achieves the effect of canceling out the change when the input value changes in the direction of becoming larger. Moreover, when the value of k is changed, the intensity of the effect can be changed. Conversely, when k is set to a negative value, the change can be enhanced.

Next, a specific example of processing performed by the image processing apparatus according to the second embodiment will be described.

In this example, a diffusion weight coefficient shown in FIG. 6 is employed as the diffusion weight coefficient used for performing weighted distribution of an error. In addition, in this example, threshold value generating unit 307 outputs a pattern of a threshold value shown in FIG. 7. The same formula as that of the first embodiment was employed as the formula for calculating P, but the threshold value is set to a smaller value than that in the first embodiment so as to mitigate dot delay in the upper left portion of an image. More specifically, the threshold value is calculated using a formula: threshold value=0.15+0.1×P.

Moreover, the original image which is the object to be processed employed was the one shown in FIG. 8.

FIGS. 19 to 22 are diagrams showing the effects when k=0, 0.6, 1, −0.5, respectively.

Figure 19:
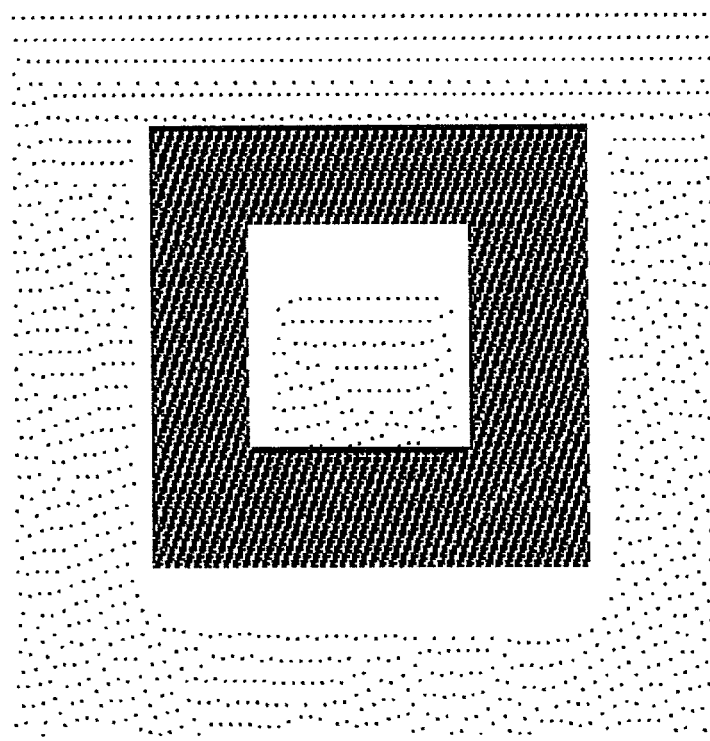
FIGS. 19 to 22 are diagrams showing the effects when k=0, 0.6, 1, −0.5, respectively, in the second embodiment.

When k=0, the processing performed by the portion indicated by the broken line in FIG. 14 is not performed, and an error diffusion processing similar to that of the reference example is performed. Consequently, the edge of an image is strengthened as shown in FIG. 19.

Figure 20:
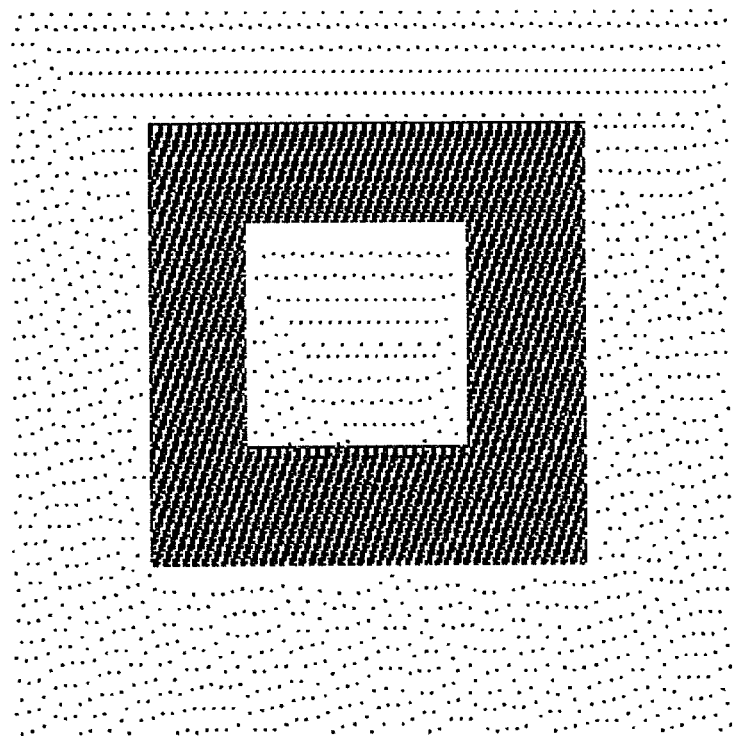
Figure 21:
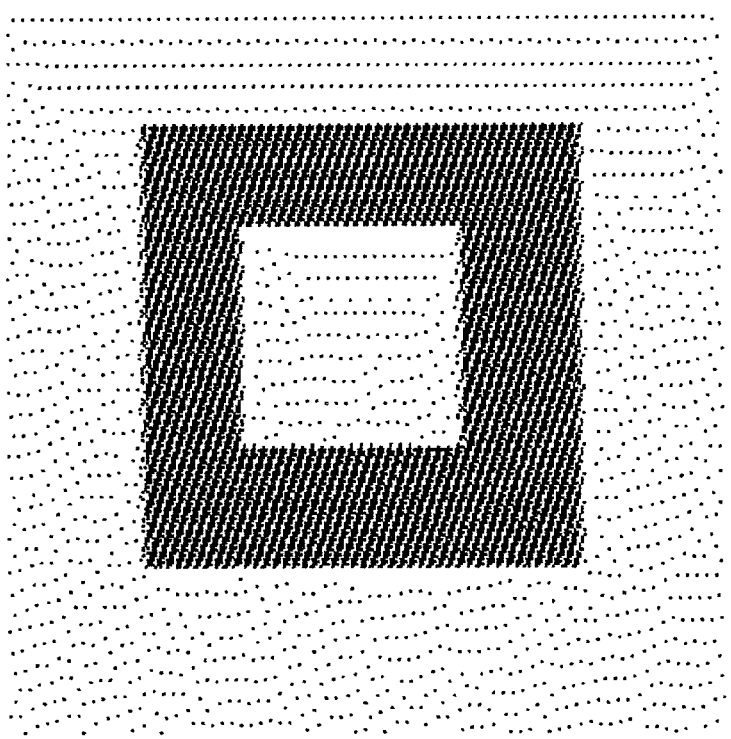

As shown in FIGS. 20 and 21, it can be seen that the edge becomes weaker as the value of k increases. Moreover, the strength of an edge may be subtly adjusted by continuously changing the value of k.

Figure 22:
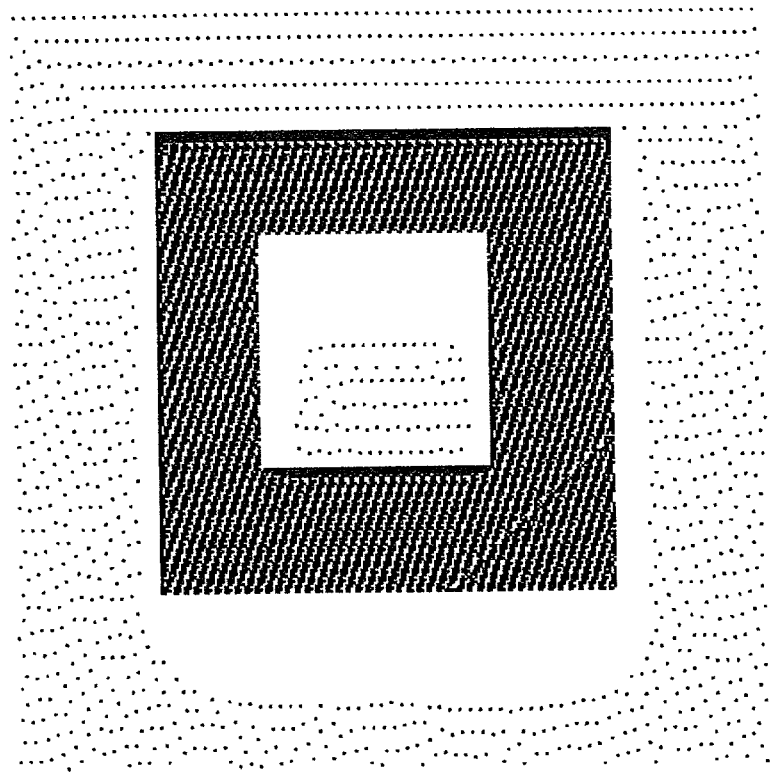

Conversely, as shown in FIG. 22, the edge can be strengthened by selecting a negative value for k.

As described above, the second embodiment allows edge control in the error diffusion method without particularly increasing the burden of processing.

Figure 23:
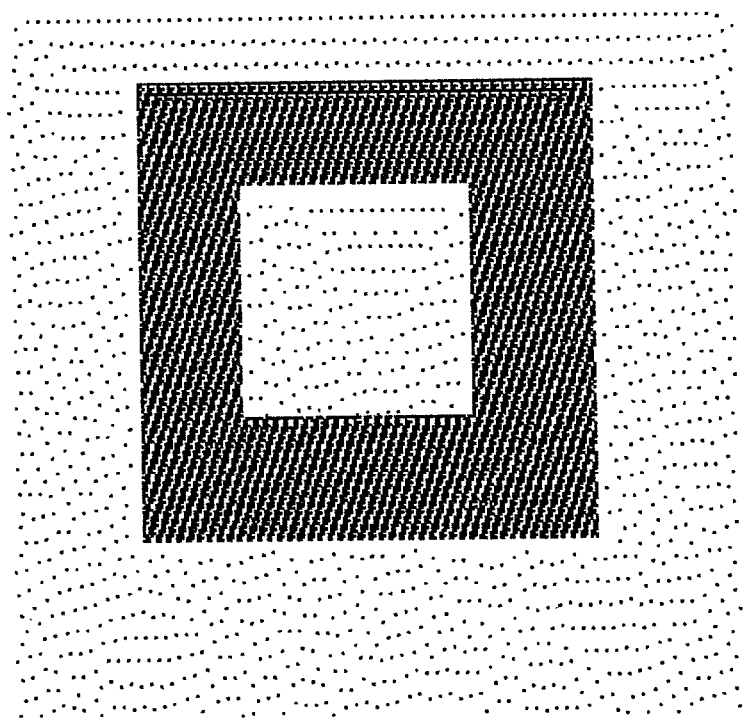
FIG. 23 is a diagram showing an image when a threshold value=0.5+0.1×P in the second embodiment.

Further, FIG. 23 is a diagram showing a result of processing of an image when it is set that a threshold value=0.5+0.1×P, and k=0.6. In this example, the threshold value is large so that dot delay is seen to have taken place in the upper left portion of the image where the processing started.

Third Embodiment

Figure 24:
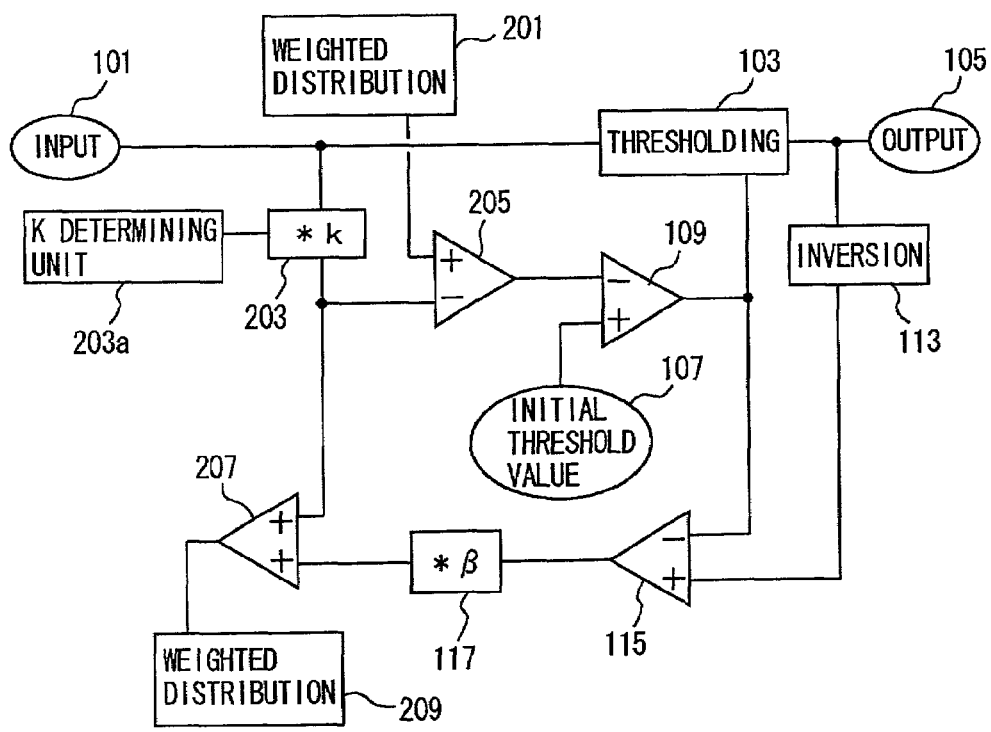
FIGS. 24 to 28 are block diagrams representing the respective arrangement of image processing apparatuses according to third to seventh embodiments of the present invention.

FIG. 24 is a block diagram representing an arrangement of an image processing apparatus according to the third embodiment.

Referring to the diagram, the third embodiment is provided with a k determining unit 203a for setting a coefficient k in addition to the arrangement of the image processing apparatus according to the first embodiment shown in FIG. 1. By operating k determining unit 203a, the user is able to change the value of k at will in order to control the degree of edge enhancement.

Fourth Embodiment

Figure 25:
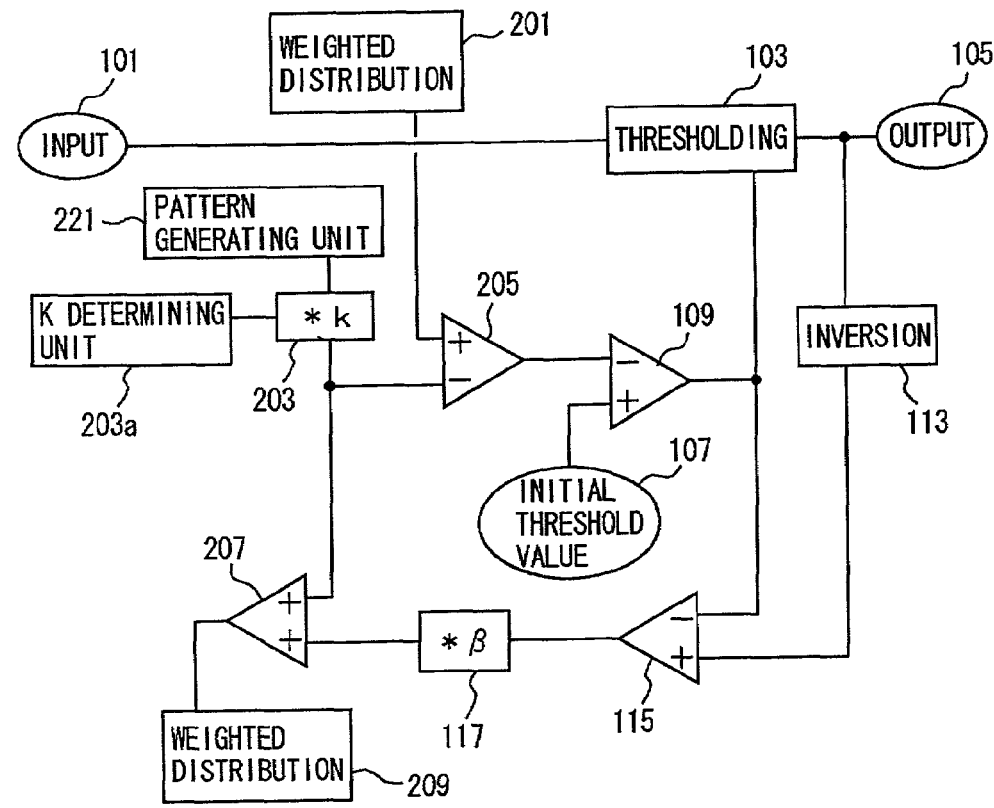

FIG. 25 is a block diagram representing an arrangement of an image processing apparatus according to the fourth embodiment of the present invention.

Referring to the diagram, the apparatus of the fourth embodiment is provided with a pattern generating unit 221 as compared to the image processing apparatus of FIG. 24. A pattern output by pattern generating unit 221 (for instance, white noise, which is a random pattern) is input to k multiplying unit 203. Then, after the multiplication by the value of k, the resultant value is input to adding unit 207 and subtractor 205.

According to the fourth embodiment, a pattern such as noise and so on may be added to an image. In addition, by setting k such that 0<k(<1), high frequency components of an output image can be decreased so as to cause the image to be influenced by pink noise. Moreover, when it is set such that k<0, high frequency components would increase so as to cause the image to be influenced by blue noise.

Fifth Embodiment

Figure 26:
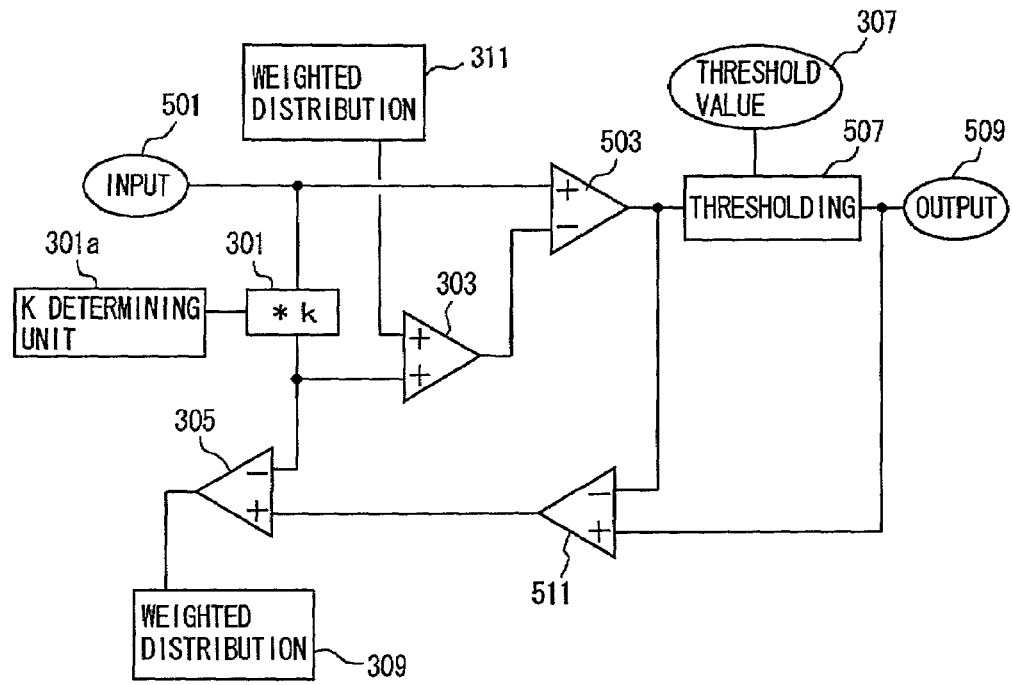

FIG. 26 is a block diagram representing an arrangement of an image processing apparatus according to the fifth embodiment of the present invention. Referring to the diagram, the apparatus of the fifth embodiment is provided with a k determining unit 301a for setting a value of k in multiplying unit 301 in addition to the arrangement of the image processing apparatus shown in FIG. 14. Consequently, the user is able to change the value of k at will through k determining unit 301a so as to control the intensity of an edge.

Sixth Embodiment

Figure 27:
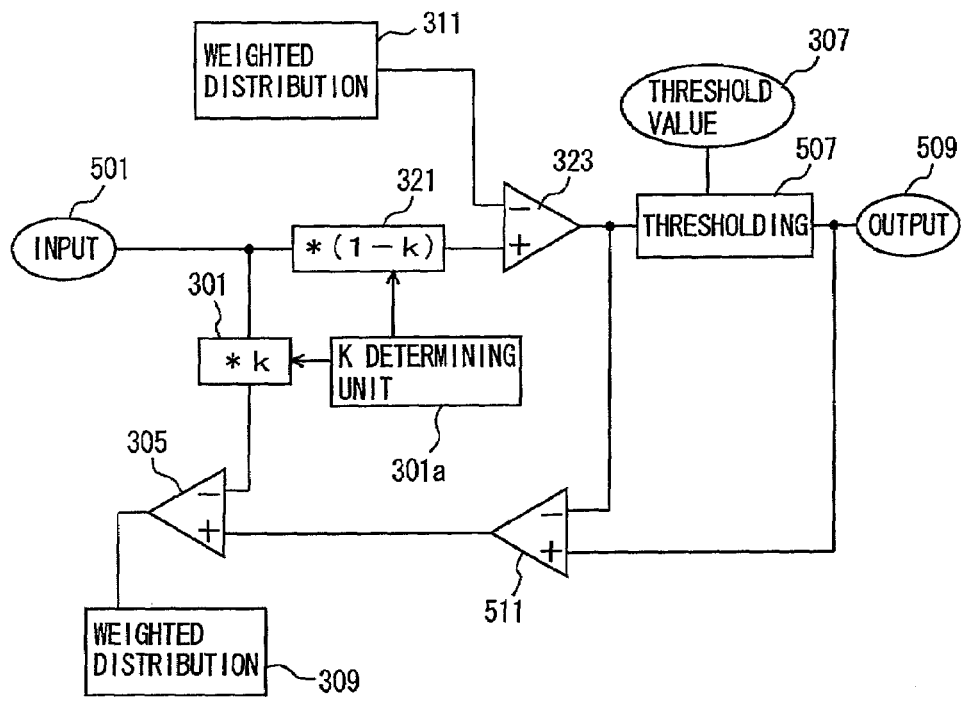

FIG. 27 is a block diagram representing an arrangement of an image processing apparatus according to the sixth embodiment of the present invention. The arrangement of the apparatus in the sixth embodiment is somewhat different from the arrangement shown in FIG. 26; yet, it is capable of performing the same operation as that of the apparatus shown in FIG. 26.

Specifically, the image processing apparatus is provided with a k multiplying unit 301 for multiplying an input from an input unit 501 by k, a (1−k) multiplying unit 321 for multiplying the input by a value of (1−k), a subtractor 323 for subtracting an error that is weighted and distributed from an output of (1−k) multiplying unit 321, a thresholding unit 507 for performing thresholding on an output of subtractor 323, an output unit 509 for outputting a result of thresholding, a subtractor 511 for subtracting the value before thresholding from a value derived after thresholding, a subtractor 305 for subtracting an output of k multiplying unit 301 from an output of subtractor 511, a threshold value generating unit 307 for generating a threshold value, and a k determining unit 301a for setting k at will.

Seventh Embodiment

Figure 28:
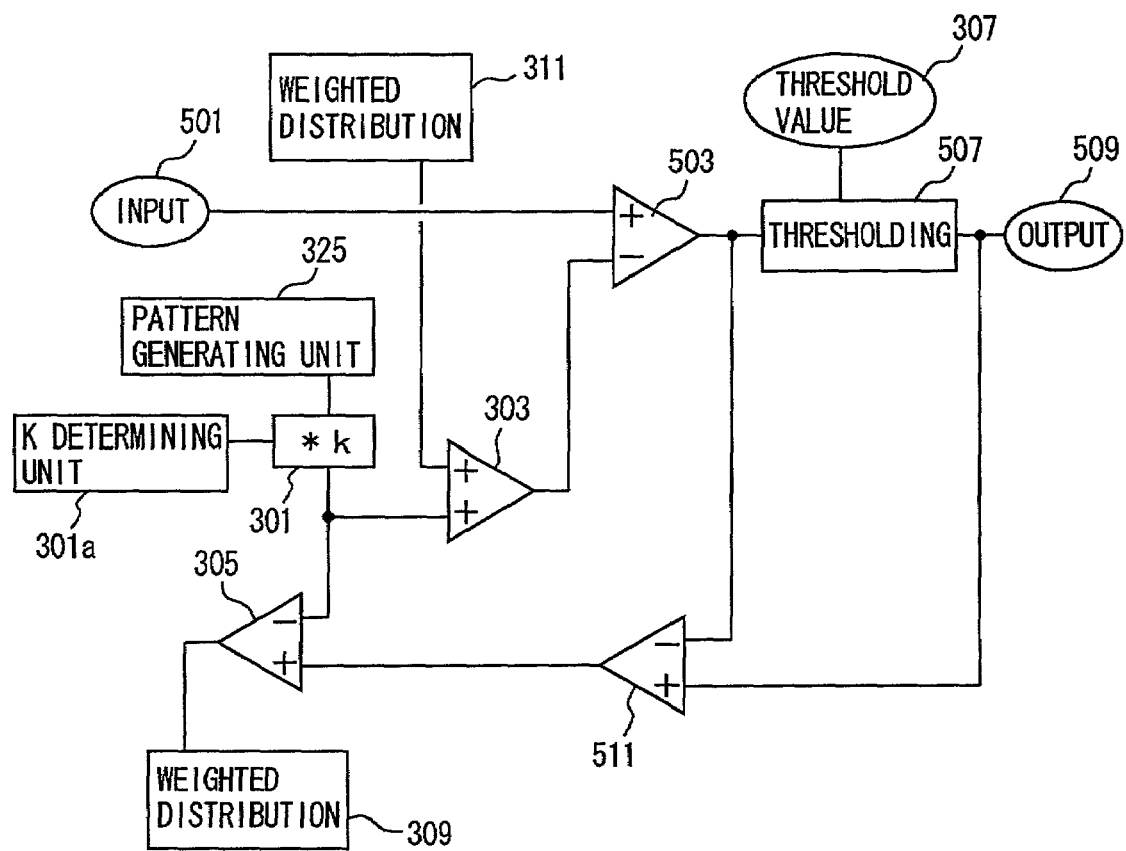

FIG. 28 is a block diagram representing an arrangement of an image processing apparatus according to the seventh embodiment of the present invention.

Referring to the diagram, the image processing apparatus of the seventh embodiment is provided with a pattern generating unit 325 in addition to the arrangement of the image processing apparatus shown in FIG. 26. An output of pattern generating unit 325 is input to k multiplying unit 301.

In this apparatus arrangement, like the image processing apparatus of FIG. 25, for instance, pattern generating unit 325 generates a pattern signal, such as white noise, that is about a few percent of the input. By setting k such that 0<k (<1), high frequency components of an output image would decrease so that the image would be influenced by pink noise. Moreover, when it is set such that k<0, high frequency components would increase so that the image would be influenced by blue noise.

Moreover, a threshold value used in FIG. 25 or FIG. 28 may be a pattern as shown in FIG. 7 or may be a constant value. In addition, a pattern as the one shown in FIG. 7 may be generated using a pattern generating unit, and a threshold value 307 may be a white noise (a random value).

The processing in the above-described embodiment may be performed by software or using a hardware circuit.

In addition, a program may be provided for executing the processing in the above-described embodiment, and such program may be stored in a recording medium such as a CD-ROM, a flexible disk, a hard disk, an ROM, an RAM, and a memory card, and provided to the user.

Furthermore, although the above description only illustrates the conversion from an input image of 256 gradations into an output image of two gradations, it is also possible to convert arbitrary input gradations into arbitrary output gradations using a similar technique.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
an input unit for successively receiving as input a first image signal representing each pixel;
a thresholding unit for performing thresholding on said inputted first image signal using a prescribed threshold value; and
a distributing unit for distributing a value used in the thresholding in a succeeding pixel, wherein
said thresholding unit performs thresholding based on the value distributed by said distributing unit and on a specific value determined for each pixel, and
said distributing unit calculates a value to be distributed to the succeeding pixel based on an input signal and an output signal of said thresholding unit and on the specific value determined for each pixel.

2. The image processing apparatus according to claim 1, wherein
said distributing unit distributes a value obtained by adding the specific value determined for each pixel to a result of operation based on a threshold value used in said thresholding unit and on an output signal from said thresholding unit, and
said thresholding unit generates a threshold value based on a result obtained by subtracting the specific value determined for each pixel from the value distributed by said distributing unit, and performs thresholding.

3. The image processing apparatus according to claim 1, wherein
said distributing unit distributes a value obtained by subtracting the specific value determined for each pixel from a result of operation based on the input signal and the output signal of said thresholding unit, and
said thresholding unit performs thresholding after correction of the first image signal input based on a result obtained by adding the specific value determined for each pixel to the value distributed by said distributing unit.

4. The image processing apparatus according to claim 1, wherein
said distributing unit distributes a value obtained by subtracting the specific value determined for each pixel from a result of operation based on the input signal and the output signal of said thresholding unit,
said input unit successively receives as input a result obtained by subtracting the specific value determined for each pixel from the first image signal, and
said thresholding unit performs thresholding after correction of a value inputted by said input unit based on the value distributed by said distributing unit.

5. The image processing apparatus according to claim 1, wherein
the specific value determined for each pixel is a value obtained by multiplying the first image signal by a prescribed coefficient.

6. The image processing apparatus according to claim 5, further comprising:
a coefficient setting unit for setting said prescribed coefficient at will.

7. The image processing apparatus according to claim 1, further comprising:
a pattern generating unit for generating a pattern for each pixel, wherein the specific value determined for each pixel is a value obtained by multiplying a value generated by said pattern generating unit by a prescribed coefficient.

8. The image processing apparatus according to claim 7, further comprising:

a coefficient setting unit for setting said prescribed coefficient at will.

9. An image processing method, comprising the steps of:

successively inputting a first image signal representing each pixel;

performing thresholding on said inputted first image signal using a prescribed threshold value; and distributing a value used in the thresholding in a succeeding pixel, wherein said thresholding step is done based on the value distributed by said distributing unit and on a specific value determined for each pixel, and said distributing step calculates a value to be distributed to the succeeding pixel based on an input signal and an output signal of said thresholding step and on the specific value determined for each pixel.

10. The image processing method according to claim 9, wherein said distributing step distributes a value obtained by adding the specific value determined for each pixel to a result of operation based on a threshold value used in said thresholding step and on an output signal from said thresholding step, and said thresholding step generates a threshold value based on a result obtained by subtracting the specific value determined for each pixel from the value distributed by said distributing step, and performs thresholding.

11. The image processing method according to claim 9, wherein said distributing step distributes a value obtained by subtracting the specific value determined for each pixel from a result of operation based on the input signal and the output signal of said thresholding step, and said thresholding step performs thresholding after correction of the first image signal input based on a result obtained by adding the specific value determined for each pixel to the value distributed by said distributing step.

* * * * *